United States Patent [19]

Gaudreault et al.

[11] Patent Number: 6,164,011
[45] Date of Patent: *Dec. 26, 2000

[54] BIODEGRADABLE AND BIOCOMPATIBLE AGRICULTURAL MULCH AND METHOD OF PREPARING SAME

[75] Inventors: Roger Gaudreault, Kingsey Falls; Michel Labbé, Victoriaville; Luc Barrette, Drummondville; Steeve Gagné, Kingsey Falls, all of Canada

[73] Assignee: Cascades Multi-Pro Inc., Drummondville, Canada

[*] Notice: This patent issued on a continued prosecution application filed under 37 CFR 1.53(d), and is subject to the twenty year patent term provisions of 35 U.S.C. 154(a)(2).

[21] Appl. No.: 09/017,497

[22] Filed: Feb. 2, 1998

[51] Int. Cl.[7] .................................................. A01G 7/00
[52] U.S. Cl. ........................................ 47/9; 47/48.5
[58] Field of Search .................................... 47/9, 48.5

[56] References Cited

U.S. PATENT DOCUMENTS

| | | | |
|---|---|---|---|
| 3,892,552 | 7/1975 | Gay, Jr. .................................. | 71/1 |
| 5,138,792 | 8/1992 | Allingham ............................... | 47/9 |
| 5,163,247 | 11/1992 | Weber et al. ............................ | 47/9 |
| 5,446,123 | 8/1995 | Gruber et al. ........................... | 528/354 |
| 5,458,933 | 10/1995 | Suskind .................................. | 428/34.2 |
| 5,798,436 | 8/1998 | Gruber et al. ........................... | 528/354 |

FOREIGN PATENT DOCUMENTS

| | | |
|---|---|---|
| 0514137 | 11/1992 | European Pat. Off. . |
| 4114857A1 | 9/1991 | Germany . |
| 09 078494 | 3/1997 | Japan . |
| 2261215 | 12/1993 | United Kingdom . |
| WO 98/00459 | 1/1998 | WIPO . |

OTHER PUBLICATIONS

Webster's Dictionary 9th Edition (definition of mulch), Dec. 14, 1998.

*Primary Examiner*—Peter M. Poon
*Assistant Examiner*—Judith A. Nelson
*Attorney, Agent, or Firm*—Gilberto M. Villacorta; Pepper Hamilton LLP

[57] ABSTRACT

The mulch comprises a sheet of paper having a thickness between 2 and 4 mils and a basis weight between about 40 $g/m^2$ and 60 $g/m^2$. The sheet has at least one face coated with a layer of polylactide, which is used in an amount such that it weighs between about 2 $g/m^2$ and 15 $g/m^2$. The preparation is carried out by depositing on the sheet an amount of a hot extruded liquid layer of polylactide such that when it solidifies, it weighs between about 2 $g/m^2$ and 15 $g/m^2$, and allowing the layer to solidify and adhere to the sheet, whereby forming the mulch.

18 Claims, No Drawings

BIODEGRADABLE AND BIOCOMPATIBLE AGRICULTURAL MULCH AND METHOD OF PREPARING SAME

BACKGROUND OF INVENTION a) Field of the Invention

This invention relates to biodegradable and biocompatible agricultural mulch and a method of preparing same. More particularly, the present invention is directed to an agricultural mulch having a programmed duration of biodegradation.

b) Description of Prior Art

Ever since the start of the present century, numerous attempts have been made to produce an agricultural mulch derived from various fibre mats. From this, it was found that no paper or cardboard would resist for a long time to degradation. This is why all the efforts have been concentrated on the necessity of finding an efficient protection against biodegradation.

On the other hand, it is well known that polylactide (PLA—polymer derived from 2-hydroxy-propanoic acid) is one of the rare polymers which are considered to be truly biodegradable. Its degradation cycle is based on a process of hydrolysis of the polymer chain. It is decomposed into lactose, water and carbon dioxide. PLA is also completely biocompatible. This means that neither the polymer nor its degradation products, are damaging to the health of living organisms. For this reason, the medical use of PLA (surgery) is well known.

Recent technological developments in the production of PLA, have made it possible to provide large quantities of PLA at competitive prices. Moreover, during its production, it is possible to modify the polymer chain so as to control its resistance against degradation. However, PLA is a material with poor mechanical properties. Since PLA is too crumbly and too brittle, it cannot be used as a film of PLA which can be mounted by means of a standard mechanical unrolling device. PLA therefore needs a support, however, the latter must at least preserve all the desired properties of PLA.

There is therefore a need for a suitable PLA-support combination which provides a good heat insulation, so that during the night it preserves humidity of the ground, and during the day, it permits a progressive but not excessive warming of the ground as it often happens in the case of a mulch of plastic material.

It is therefore an object of the present invention to provide a mulch which enables the temperature of the ground to constantly remain within an optimum growth zone, which significantly advantages the plants at the start of the season.

It is another object of the present invention to provide a mulch which offers excellent thermal insulation to young seeds at the start of the season, while completely preventing the growth of weeds, which cannot grow through the mulch.

It is another object of the present invention to provide a mulch which makes it possible to dispense with the use of dangerous products by fumigation, such as methyl isothiocyanate, chlorinated hydrocarbons, and the like.

It is still another object of the present invention to provide a mulch which will remain in place until complete biodegradation.

It is still another object of the present invention to provide a method of preparing a mulch which overcomes all the disadvantages of those described in the prior art.

These and other objects of the present invention may be achieved by providing a biodegradable and biocompatible agricultural mulch comprising a sheet of cellulose fibres, preferable a sheet of paper, having a basic weight between about 40 $g/m^2$ and 60 $g/m^2$, the sheet having at least one face coated with a layer of polylactide. The layer is being used in an amount such that it weighs between about 2 $g/m^2$ and 15 $g/m^2$.

In practice, the paper is made of recycled cellulose fibres. Its thickness varies between 2 mils and 4 mils. Normally, one face opposite the layer of PLA is coated with biological additives, such as 10-6-0, 0-20-0, 0-0-22 and mixtures thereof.

The layer of polylactide preferably comprises a light absorbing agent, which may be a coloring, and which may be used in amounts from about 3 to 8 weight percent of PLA. The preferred light absorbing agent comprises carbon black, although any other light absorbing agent could be used depending on the amount of light that is intended to be absorbed.

The biodegradable and biocompatible agricultural mulch according to the invention may be prepared by providing a sheet of cellulose fibres having a basis weight between about 40 $g/m^2$ and 60 $g/m^2$, depositing on the sheet an amount of a liquid layer of polylactide such that when the layer has solidified, it weighs between about 2 $g/m^2$ and 15 $g/m^2$, and allowing the layer of PLA to solidify to adhere to the sheet and to constitute the mulch therewith.

Depositing of the PLA layer onto the sheet is normally carried out by hot extrusion of PLA to produce a liquid and placing a layer of the liquid onto the sheet, which is normally a sheet of paper, preferably recycled paper.

Since it is possible to modify the polymer chain of PLA, it is possible to adjust its resistance to biodegradation, and therefore its life duration, which contributes to make it a privileged material for the production of an agricultural mulch. It will indeed be realized that it is then possible to optimize the protection of young growth as a function of the needs of different varieties of vegetables and trees.

One will find that PLA is a perfect addition to a mat of cellulose fibres. This combination produces a mulch which meets the requirements of modern agricultural production: sufficient useful life to last during an entire seasonal growth, and mechanized installation. At the start of the season, the fibre mat offers excellent thermal insulation to young seeds while completely preventing the growth of weeds, which cannot grow through the mulch according to the invention as is the case with a mulch of plastic material.

Once in place, and after the paper support has been biodegraded, the PLA film need no support and will remain in place until it has been completely biodegraded. At the end of the season, no particular disposition will be required. A simple plowing will be sufficient to incorporate the remaining PLA into the soil. Since biodegradation has converted PLA into a material which is even more brittle, it will offer no resistance to the mechanical working of the soil. Moreover, the natural fertilizing properties of lactose, which is a residue resulting from biodegradation of PLA, are added to the soil.

PLA is a material which is naturally transparent. It is therefore possible to color it as desired: white to limit heat transmission or with any other color which would optimize the yields of the plants.

Of course, the invention is not limited to the method of preparation described above, and any other method which is well know to those skilled in the art falls within the scope and spirit of the present invention.

We claim:

1. An agricultural mulch comprising:

a sheet of paper;

said sheet having at least one face coated with a layer of polylactide, wherein said layer is deposited on to said sheet by a hot extrusion process such that when said layer has solidified, the layer weighs between about 2 g/m$^2$ and 15 g/m$^2$, to provide an agricultural mulch that is both biodegradable and biocompatible and which does not exhibit a high gloss.

2. The agricultural mulch of claim 1, said sheet of paper having a weight between about 40 g/m$^2$ and 60 g/m$^2$.

3. The agricultural mulch of claim 2, said sheet of paper having a thickness between 2 mils and 4 mils.

4. The agricultural mulch of claim 1, having one face opposite said layer coated with biological additives.

5. The agricultural mulch of claim 4, wherein said biological additives are selected from the group consisting of 10-6-0, 0-20-0, 0-0-22 and mixtures thereof.

6. The agricultural mulch of claim 1, wherein said layer further comprises a light absorbing agent.

7. The agricultural mulch of claim 6, wherein said light absorbing agent comprises a coloring agent.

8. The agricultural mulch of claim 6, wherein said layer comprises about 3 to 8 w/w percent light absorbing agent.

9. The agricultural mulch of claim 6, wherein said light absorbing agent comprises carbon black.

10. The agricultural mulch of claim 1, wherein said sheet of paper is made of recycled cellulose fibers.

11. A method of preparing a biodegradable and biocompatible agricultural mulch which comprises:

providing a sheet of paper;

depositing on said sheet by a hot extrusion process an amount of a liquid layer of polylactide such that when said layer solidifies, said layer weighs between about 2 g/m$^2$ and 15 g/m$^2$; and allowing said layer to solidify and adhere to said sheet to provide an agricultural mulch that is both biodegradable and biocompatible and which does not exhibit a high gloss.

12. The method of claim 11, wherein said paper has a thickness between 2 mils and 4 mils and has a weight between 40 g/m$^2$ and 60 g/m$^2$.

13. A method of improving agricultural production comprising:

providing an agricultural mulch comprising a sheet of paper having at least one face coated with a layer of polylactide, such that said agricultural mulch is both biodegradable and biocompatible;

placing said agricultural mulch on the ground to provide a growth zone for plants.

14. The method of claim 13, wherein said mulch is provided in the form of a roll and wherein the mulch is placed on the ground with a mechanical unrolling device.

15. An agricultural mulch comprising:

a sheet of paper;

said sheet having at least one face coated with a layer of polylactide, wherein said layer is deposited on to said sheet by a hot extrusion process such that when said layer has solidified, the layer weighs between about 2 g/m$^2$ and 15 g/m$^2$, to provide an agricultural mulch that is both biodegradable and biocompatible, does not exhibit a high gloss and is capable of installation on the ground with a mechanical unrolling device.

16. The agricultural mulch of claim 15, wherein said layer further comprises about 3 to 8 w/w percent light absorbing agent.

17. The agricultural mulch of claim 16, wherein said light absorbing agent comprises carbon black.

18. A method of preparing a biodegradable and biocompatible agricultural mulch which comprises:

providing a sheet of paper;

depositing on said sheet by a hot extrusion process an amount of a liquid layer of polylactide such that when said layer solidifies, said layer weighs between about 2 g/m$^2$ and 15 g/m$^2$; and allowing said layer to solidify and adhere to said sheet to provide an agricultural mulch that is both biodegradable and biocompatible, does not exhibit a high gloss, and is capable of installation on the ground with a mechanical unrolling device.

* * * * *